US009011724B2

(12) United States Patent
Tetzlaff

(10) Patent No.: US 9,011,724 B2
(45) Date of Patent: Apr. 21, 2015

(54) METHOD AND DEVICE FOR PRODUCING LOW-TAR SYNTHESIS GAS FROM BIOMASS

(76) Inventor: Karl-Heinz Tetzlaff, Kelkheim (DE)

(*) Notice: Subject to any disclaimer, the term of this patent is extended or adjusted under 35 U.S.C. 154(b) by 193 days.

(21) Appl. No.: 13/003,171

(22) PCT Filed: Jul. 7, 2009

(86) PCT No.: PCT/EP2009/058638
§ 371 (c)(1),
(2), (4) Date: Apr. 8, 2011

(87) PCT Pub. No.: WO2010/003968
PCT Pub. Date: Jan. 14, 2010

(65) Prior Publication Data
US 2012/0091395 A1   Apr. 19, 2012

(30) Foreign Application Priority Data

Jul. 8, 2008 (DE) .......................... 10 2008 032 166

(51) Int. Cl.
| | | |
|---|---|---|
| *C01B 3/38* | (2006.01) | |
| *C10J 3/66* | (2006.01) | |
| *C10J 3/48* | (2006.01) | |
| *C10J 3/72* | (2006.01) | |

(52) U.S. Cl.
CPC .. *C10J 3/66* (2013.01); *C10J 3/482* (2013.01); *C10J 3/721* (2013.01); *C10J 2300/0903* (2013.01); *C10J 2300/0909* (2013.01); *C10J 2300/0986* (2013.01); *C10J 2300/1238* (2013.01); *Y02E 50/14* (2013.01)

(58) Field of Classification Search
USPC ....................................................... 252/373
See application file for complete search history.

(56) References Cited

U.S. PATENT DOCUMENTS

| | | | |
|---|---|---|---|
| 3,128,164 A | | 4/1964 | Moritz et al. |
| 4,441,892 A | * | 4/1984 | Schuster ...................... 48/197 R |
| 4,799,937 A | | 1/1989 | Nieminen |
| 5,034,197 A | * | 7/1991 | Potinkara ...................... 422/146 |
| 5,146,878 A | * | 9/1992 | Hulkkonen ................... 122/510 |
| 6,808,543 B2 | * | 10/2004 | Paisley ......................... 48/197 R |
| 2001/0047040 A1 | * | 11/2001 | Agee et al. .................... 518/704 |

(Continued)

FOREIGN PATENT DOCUMENTS

| | | |
|---|---|---|
| CN | 1148080 A | 4/1997 |
| DE | 1931166 A1 | 1/1971 |

(Continued)

OTHER PUBLICATIONS

Bolhar-Nordenkampf et al., Scale-up of a 100kWth pilot FICFB-gasifier to a 8 MWth FICFB-gasifier demonstration plant in Gussing (Austria), International Ukranian Conference on BIOMASS for Energy, Sep. 2002.

*Primary Examiner* — Melvin C Mayes
*Assistant Examiner* — Kenneth Vaden
(74) *Attorney, Agent, or Firm* — The Webb Law Firm

(57) ABSTRACT

A method and device for producing low-tar synthesis gas from biomass. The method according to the invention lowers the tar content in the synthesis gas by splitting the biomass into pyrolysis coke and pyrolysis gas in a fluidized bed reactor, both of which are fed to at least one more fluidized bed reactor, wherein tars in the largely tar-free pyrolysis coke are catalytically split at a higher temperature without the ash melting point being exceeded. The method according to the invention enables the production of largely tar-free synthesis gas.

16 Claims, 4 Drawing Sheets

(56) References Cited

U.S. PATENT DOCUMENTS

| | | | |
|---|---|---|---|
| 2007/0220805 A1* | 9/2007 | Leveson et al. | 44/605 |
| 2007/0270511 A1* | 11/2007 | Melnichuk et al. | 518/700 |
| 2008/0242749 A1* | 10/2008 | Van Hardeveld et al. | 518/713 |

FOREIGN PATENT DOCUMENTS

| | | |
|---|---|---|
| DE | 3004111 A1 | 8/1981 |
| DE | 3228532 A1 | 2/1984 |
| DE | 19926202 C1 | 2/2001 |
| DE | 60120957 T2 | 2/2007 |
| DE | 102008012154 A1 | 9/2009 |
| DE | 102008012156 A1 | 9/2009 |
| EP | 0979857 A2 | 2/2000 |
| EP | 1312662 A2 | 5/2003 |
| FR | 2863920 A1 | 6/2005 |
| GB | 2164660 A | 3/1986 |
| JP | 57-96944 U1 | 12/1955 |
| JP | 50-30904 A | 3/1975 |
| JP | 58-195780 A | 11/1983 |
| JP | 61250095 A | 11/1986 |
| JP | 63210188 A | 8/1988 |
| JP | 05-93513 A | 4/1993 |
| JP | 07-90285 A | 4/1995 |
| JP | 08-134473 A | 5/1996 |
| JP | 10081885 A | 3/1998 |
| RU | 2038344 C1 | 6/1995 |
| RU | 2291350 C1 | 1/2007 |
| UA | 58389 A | 7/2003 |
| WO | 0168789 A1 | 9/2001 |

* cited by examiner

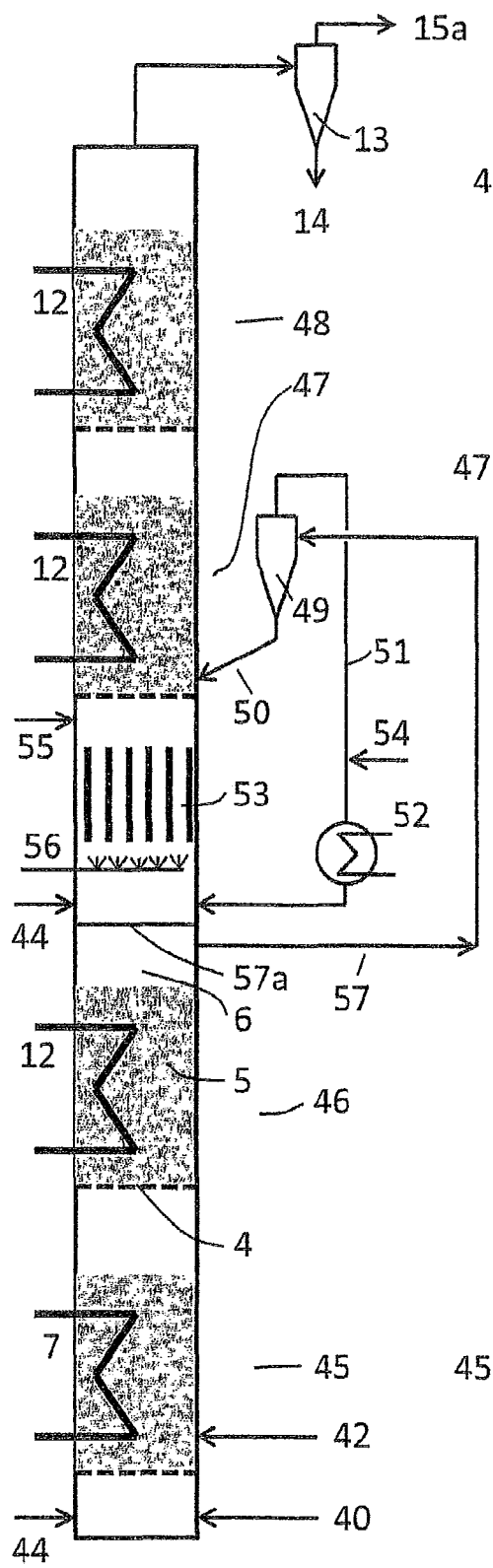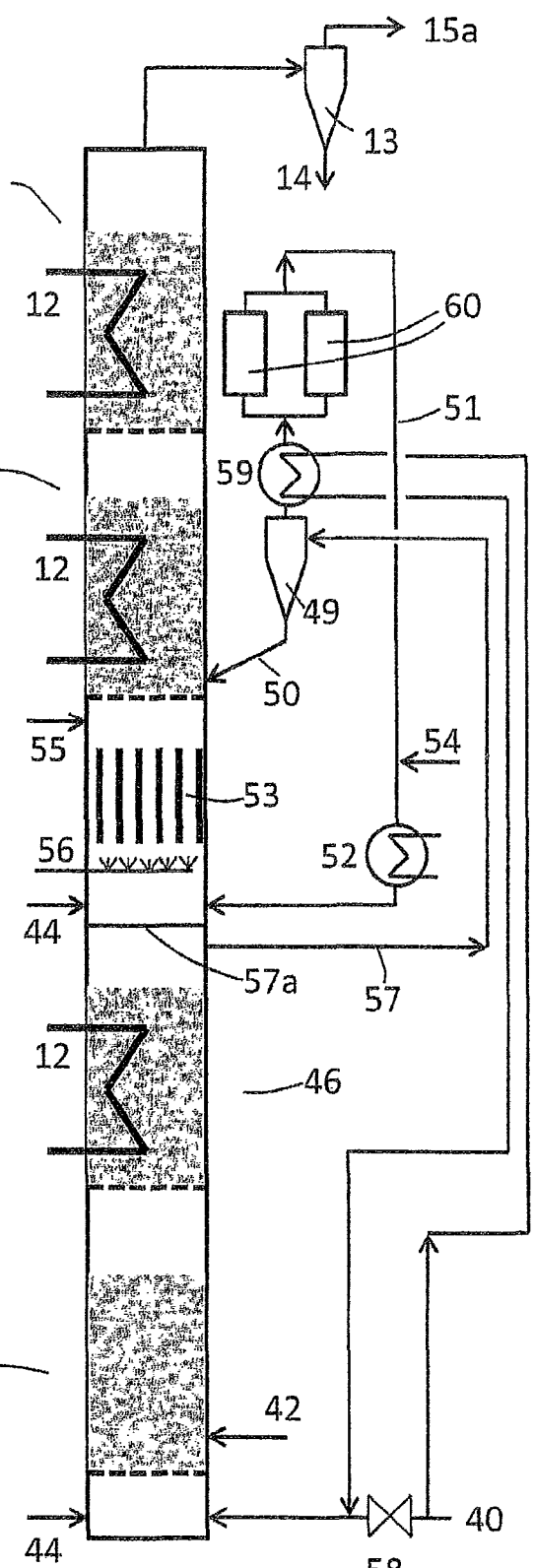

METHOD AND DEVICE FOR PRODUCING LOW-TAR SYNTHESIS GAS FROM BIOMASS

The invention concerns a method and a device for the thermochemical production of synthesis gas from energy sources containing carbon, in particular from biomass. The largely tar-free synthesis gas obtained is particularly suitable for chemical syntheses, in particular for the production of hydrogen.

Here biomass means all substances of biological origin. Synthesis gas comprises predominantly hydrogen ($H_2$), carbon monoxide (CO), carbon dioxide ($CO_2$) and methane ($CH_4$).

BACKGROUND TO THE INVENTION

Against the background of increasingly scarcer fossil fuels the conversion of biomass into an easy to distribute gas offers an economical alternative. If the primary synthesis gas that results is then further converted into hydrogen, and distributed to the end customer, decentralised power generation by means of fuel cells is even possible. The production and use of hydrogen requires a very pure and low-nitrogen synthesis gas. These requirements also apply for other chemical syntheses.

For the thermochemical production of synthesis gas from biomass essentially three methods are known.

For the low power range, fixed bed gasifiers in a number of variants predominate. Fixed-bed gasifiers are reliant on a consistently high quality of the biomass and are not suitable for the production of high-quality synthesis gas which is suitable for further processing into hydrogen.

The entrained-flow gasifier is particularly well-suited to high powers of 1 GW upwards, since the reactor size of the entrained-flow gasifier is relatively small. For small plants the entrained-flow gasifier is uneconomic because of the high-cost of the equipment. The entrained-flow gasifier requires extensively dry biomass or primary products, because at high temperatures the entrained-flow gasifier works with pure oxygen. The ashes sinter like glass and are unsuitable for use as a mineral fertilizer. This is a problem given that fertilizers are becoming more expensive and more scarce.

The fluidized bed reactor comes into its own in the medium industrial power range of 1 MW to 1 GW. The ash from fluidized-bed reactors can be used as a mineral fertilizer in agriculture. In methods with fluidized bed reactors a distinction can be made between autothermal and allothermal gasification.

In autothermal gasification part of the biomass is burned in the fluidized bed reactor to cover the expiring endothermic reactions. The autothermal gasification is air-operated. Pure oxygen would lead to localised overheating in the fluidized bed. Methods which use air as the fluidization gas are therefore not so easy to convert to oxygen. The use of air leads to dilution of the synthesis gas with nitrogen and $CO_2$, making its use for power generation and further processing into products of hydrogen, methane, methanol or liquid fuels more difficult.

With allothermal gasification the necessary heat is introduced through heat transfer. This can take place, for example, by means of heating rods in the fluidized bed, as described in DE 199 26 202 C1. Heat transfer media circulating between a burner and a synthesis gas reactor are also known. As a heat transfer medium sand is usually used, which is heated in a second reactor by combustion of part of the biomass. Such a gasifier with a thermal power of 8 MW can be found in Güssing, Austria. This plant was presented at the 1$^{st}$ International Ukranian Conference on BIOMASS FOR ENERGY; Sep. 23-27, 2002 Kyiv, Ukraine by M. Bolhar-Nordenkampf et al. under the title: "Scale-up of a 100 $KW_{th}$ pilot FICFB to 8 $MW_{th}$ FICFB-gasifier demonstration plant in Güssing (Austria)". Steam is used as the fluidizing gas for the synthesis gas reactor. The provision of steam calls for an additional expenditure of energy, in many cases reduces the efficiency and increases investment costs.

As a rule the biomass is fed into the synthesis gas reactor directly, leading to a very high tar content, because coarse parts of the biomass after a few seconds can reach the upper part of the fluidized bed and the emitted gases containing tar that are formed reach the synthesis gas directly. This makes in any case an expensive method for removal of the tar necessary. The recovery of sensible heat is only possible to a limited extent, because at below 350° C. tar deposits on the walls of the apparatus. The problem of tar is currently the greatest drawback in gasification of biomass.

From DE 601 20 957 T2 a method is known in which biomass is first decomposed in a pyrolysis reactor into pyrolysis coke and pyrolysis gas in order then to pass these two to a reactor for generation of synthesis gas. The method is tailored to the use of air and therefore has a high quantity of nitrogen in the synthesis gas. Due to the design and operation of the pyrolysis reactors quite coarse coke reaches the synthesis gas reactor. This coarse coke is not yet fully degassed and causes a high tar content in the synthesis gas. The tar and nitrogen content however, following simple washing, meets the requirements for combustion engines, but meets not the requirements for production and use of hydrogen and the conducting of other chemical syntheses.

It is an object of the invention to largely avoid the disadvantages described and through primary measures to provide a low-tar synthesis gas with a high yield.

SUMMARY OF THE INVENTION

According to the invention a method for producing low-tar synthesis gas from biomass is provided in which
 a) the biomass in at least one first fluidized bed reactor is decomposed into at least the components pyrolysis gas and pyrolysis coke,
 b) the gas generated in the first fluidized bed reactor is fed as fluidizing gas to at least one subsequent fluidized bed reactor,
 c) the pyrolysis coke is withdrawn in fine particles with the gas and fed to the subsequent fluidized bed reactor.

The production method according to the invention delivers synthesis gas, the tar content of which is considerably lower than that of the synthesis gas produced according to conventional fluidized bed methods. "Low-tar" synthesis gas within the meaning of the invention is understood to be in particular synthesis gas with a tar content of less than 1,000 mg/m$^3$. The synthesis gas produced using the method according to the invention preferably has a much lower tar content, however. In particular the tar content of the synthesis gas produced using the method according to the invention is preferably lower than 500 mg/m$^3$, more preferably lower than 200 mg/m$^3$. The method according to the invention is also suitable for the production of synthesis gas with a tar content of less than 100 mg/m$^3$, in particular of less than 50 mg/m$^3$. According to a particularly preferred embodiment of the invention using the method according to the invention synthesis gas is produced having a tar content of less than 10 mg/m$^3$, in particular of less than 2 mg/m$^3$, more preferably less than 1 mg/m$^3$. Synthesis gas with a tar content of <1 mg/m$^3$ is suitable for direct use in chemical syntheses, in particular for the production of hydrogen. The method according to the invention is therefore suitable for production of essentially tar-free synthesis gas.

The production method according to the invention inter alia provides that the pyrolysis coke is withdrawn in fine particles with the gas from the first fluidized bed reactor and fed to the subsequent fluidized bed reactor. "Fine particles" within the meaning of the invention are understood to be particles which because of their size or their mass under the conditions prevailing in the reactor are capable of be withdrawn with the gas from the first reactor. Suitable pyrolysis coke particles preferably have an average particle size of less than 5 mm, in particular of less than 2 mm, more preferably of less than 1 mm.

The advantages that can be obtained with the invention are in particular based on the fact that with the method according to the invention the tar content in the synthesis gas compared with the prior art can be very greatly reduced by primary measures. The synthesis gas produced with the method according to the invention is further characterised by a low nitrogen content. The synthesis gas is thus suitable for subordinate syntheses. The extensive lack of tar saves costly cleaning of the synthesis gas and costly cleaning of waste water contaminated with tar. The sensible heat of the synthesis gas can be usefully employed for heating the ingoing material flows, because in the heat exchangers no tar can condense. Utilisation of the sensible heat can be simplified by the cascading of fluidized bed reactors and/or integration of biomass drying. As a result of the predominantly electrical heating of the process, neither waste gases nor waste gas losses occur. The method therefore has a very high efficiency. Unlike fixed bed gasifiers or entrained-flow gasifiers, the ash of the biomass can be used as mineral fertilizer. For increasingly scarcer phosphorous this is of great significance. Because of the growing importance of providing energy from renewable sources the invention is described against the background of a biomass-based solar hydrogen economy.

DETAILED DESCRIPTION OF THE INVENTION

In a future solar hydrogen economy hydrogen will be predominantly piped to the end customer. As a result of the high efficiency of decentralised electricity generation from hydrogen in fuel cells there will be an excess of power at virtually all end users. In this heat-controlled energy economy electric power and heat power will thus have the same value. Because a heat-controlled energy economy in principle has no losses, the need for primary energy, here biomass, will drastically reduce. Against this background the use of electrical energy to provide the reaction enthalpy for the production of synthesis gas is also economical. Unlike at present, the use of electrical energy is not associated with losses. The electrical energy is reflected in the energy content of the hydrogen generated and is converted almost without any losses at all into power and heat. Part of the power is then used for the production according to the invention of synthesis gas. The heat can always be used. On top of this, heating with electrical energy has the advantage that no flue gases result and thus the method is extensively waste gas-free. The method according to the invention is also suitable for recycling of pure oxygen from the water electrolysis. The winning of oxygen from decomposition of air is only economical for very large plants, however. Methods with fluidized bed reactors have a typical plant size of between 1 MW and 1 GW, preferably of between 20 MW and 500 MW. Whilst being more economical, large plants often come up against logistical limits. A hydrogen economy is a regional and decentralised energy economy.

The plants should therefore be able to work under raised pressure of between 5 and 50 bar, so that the gas generated can be easily cleaned and fed directly into the regional medium-pressure gas network. For this reason the method according to the invention against the background of a plant for generating hydrogen will preferably be operated with an input pressure of 20-40 bar, in particular with an input pressure of approximately 30 bar.

With the method according to the invention the production of the synthesis gas takes place in a cascade of at least two fluidized bed reactors. In the first fluidized bed reactor the biomass is split into pyrolysis gas and pyrolysis coke. Through an inert bed material such as sand the pyrolysis coke is finely ground in the fluidized bed. In a stationary fluidized bed only finely ground coke can leave the fluidized bed reactor together with the pyrolysis gas. A stationary fluidized bed is therefore better suited to the method according to the invention than a circulating fluidized bed, in which sand and coarser coke particles are withdrawn. Finely ground coke particles contain within them virtually no primary and secondary tar because the mass and heat transfer in small particles is very high. This coke can therefore be described as essentially tar-free. This is a condition for the generation of tar-free synthesis gas.

The pyrolysis gas loaded with pyrolysis coke reaches the subordinate fluidized bed reactor. The pyrolysis gas is therefore the fluidizing gas for the subordinate fluidized bed reactor. In this fluidized bed reactor pyrolysis gas meets finely ground hot coke, which splits the tars contained in the pyrolysis gas predominantly catalytically into $H_2$, CO, $CO_2$ and $CH_4$. If the fluidized bed reactor is the final fluidized bed reactor in a cascade of several fluidized bed reactors, then it is here that the biomass used is ultimately converted into synthesis gas. The terms "pyrolysis reactor" and "reformer" are no longer used for more than two fluidized bed reactors. Rather it is a case of reactors whose temperatures in subordinate reactors increase and whose tar content in the subordinate reactors decreases. The first fluidized bed reactor in the method can, at all events, be termed a "pyrolysis reactor". In order to convert the coke quantitatively as a rule temperatures of 850° C. to 1,000° C. are necessary. According to the invention, therefore, it is preferably provided that at least one fluidized bed reactor is heated, for example using electrical resistance heating in the form of heating rods, which are immersed into the fluidized bed.

The first fluidized bed reactor in a cascade of several requires only slight addition of heat, because the splitting of the biomass into pyrolysis gas and pyrolysis coke has virtually no heat effect.

If superheated steam is used as the fluidizing gas with pre-heated biomass this reaction runs almost by itself. Nevertheless, it is advantageous to introduce some heat so that the pyrolysis coke is also converted at least in part. In this way an extensively tar-free coke is obtained for the subordinate fluidized bed reactor, which improves the quality of the synthesis gas. The introduction of heat in the pyrolysis reactor takes place in an advantageous manner by means of pipes in the fluidized bed, through which the hot synthesis gas is passed. The tangible heat of the synthesis gas can also be used for generating and superheating the steam which serves as the fluidizing gas for the pyrolysis reactor.

According to an advantageous embodiment of the invention, the gas containing tar can be heated prior to entering a subsequent fluidized bed reactor. In this way the tar content in the gas can be reduced. The heated gas cools through the endothermic reaction with coke particles in the subsequent reactor, which is known as chemical quench. The heating can for example take place by means of an electrical heating register, which is fitted between two fluidized bed reactors and takes the form of a tubular heat exchanger. If the pyrolysis gas contains coke particles, the wall temperature of this heating register, when wood is used should preferably not exceed the ash melting point of 1,200° C.

According to a further embodiment of the invention for biomass with a low ash melting point, it is better to separate the pyrolysis coke from the pyrolysis gas and to heat only the dust-free pyrolysis gas. The temperature can then be raised much further. Localised strong heating through the addition of pure oxygen is then possible at this point.

A particularly effective method for destroying tar is the creation of a plasma through electrical discharges. The plasma also destroys the circular molecules which have a particularly strong bond. The plasma can for example be created by arcing between at least two electrodes. An arrangement of several electrodes between which discharges are triggered alternately is advantageous. In this way high turbulences are achieved in the gas and thus a high reaction rate of the free radicals formed. Arc discharges are thus much more effective than simple heating. Through arc discharges the gas is of course also fully heated. Instead of an arrangement of at least two electrodes in the gas space between two fluidized bed reactors an arrangement of hollow electrodes can be used accommodated in a separate housing. Here the discharges take place in a pipe between circular electrodes. Such devices are known as plasma converters. The pipe can be passed through by part of the pyrolysis gas or a carbon-free gas such as steam. Hydrocarbons are decomposed in the arc mainly into hydrogen and carbon (cracking soot). Both products can be converted directly or in the subsequent fluidized bed reactor into synthesis gas.

According to a further embodiment, the superheated gas containing tar can be passed through a catalytic bed. In this way a reduction in the tar content even at relatively low temperatures is possible. Nickel-based catalysts have proven themselves here.

The effectiveness of a catalyst can be significantly improved if the gas containing tar, before it is brought into contact with the catalyst, is rid of all harmful substances, in particular halogenides and/or alkalis. Desulphurisation is also particularly effective. For this purpose hot gas desulphurisation is sufficient. Oxides of metals such as for example Ca, Fe and Zn, including in mixtures with other metal oxides are suitable for this. Some of these oxides can also crack organic compounds of the sulphur and nitrogen (COS, HCN). Many metal oxides can be regenerated with air or steam. The gas containing tar must if possible be cooled to 600° C. This does not have any effect on the efficiency of the process, however, because the heat released can be introduced into the process stages upstream. Also suitable is dry cleaning with consumptive chemicals such as for example calcium hydroxide (Ca(OH)$_2$). Such a solution is simply blown into the gas flow and harmful substances removed by filtering A particularly simple arrangement of fluidised bed reactors is obtained when the fluidised bed reactors are arranged directly on top of each other. In this way the reaction characteristics of a cascade of stirred tanks are obtained which invariably has a positive effect on the product quality.

The use of dry biomass and the separate procurement of steam for production of synthesis gas is in itself less complicated than using wet biomass. The useful potential of dry biomass is very limited, however. Greater potential exists with annual energy crops, which in the main can only be stored as silage. It is therefore important that the process also allows biomass with water contents of 30% to 50%. The input of biomass with even high water contents is not necessary, because the water can be squeezed out cold beforehand and processed into biogas in an advantageous manner. In addition a raised water content makes the introduction of the biomass into a pressurised container easier. In accordance with DE 10 2008 012 156.8 and DE 10 2008 012 154.1 feed screws are known which in their interior form a plug which prevents backflows of gas.

The direct in-feeding of wet biomass with a water content of significantly more than 40% into the pyrolysis reactor can lead to losses in efficiency, for the steam that is also needed as fluidizing gas would only have the effect of ballast with a resultant adverse effect on the heat balance. It is therefore advantageous to dry the wet biomass and to pass the resultant exhaust vapours to the pyrolysis reactor as fluidizing gas. For industrial scale plants it is expedient to dry the biomass in a moving bed or fluidized bed. During this drying process the biomass should be heated to not more than 280° C., because otherwise an exothermic decomposition of the biomass begins. The drying device should also preferably contain an exhaust vapours circuit, comprising heat exchangers for introducing the process heat. The exhaust vapours circuit is generated by a compressor.

The device for drying the biomass can also be preceded by a similar device for pre-heating the biomass which preferably likewise has a condenser and heat exchangers for introducing process heat. With pressurised systems the temperature level of this pre-heating is considerably lower than the temperature level of the device for drying the biomass. At 30 bar the steam pressure is for example 234° C. The pre-heating in this case would advantageously take place at a temperature level of 80° C.-150° C. In this way two heat sinks are available which allow almost complete use to be made of the sensible heat from the process. The result is extraordinarily high efficiency.

In the device for pre-heating the biomass a significant quantity of water can also be already be condensed if a product gas is mixed into this circuit. It is particularly advantageous to use for this carbon dioxide ($CO_2$) from the further processing of the synthesis gas. Excess $CO_2$ results from virtually all subsequent chemical syntheses from synthesis gas, including from the production of hydrogen. It is particularly advantageous to use for this a $CO_2$ fraction which still contains combustible components which would otherwise have to be disposed of by combustion. With the $CO_2$ fed in a partial quantity of the water from the biomass is also entrained according to the partial pressure of the water vapour. This increases the heat that can be introduced into this gas circuit. Thus the condensation heat from the water contained in the synthesis gas can also be used in part. If this $CO_2$-containing gas is passed on to the device for drying the biomass, then the drying takes place at a lower temperature level. The $CO_2$ introduced also serves as a source of carbon for the synthesis gas. While this calls for greater use of electrical energy, in the production and use of hydrogen it has no influence on the available useful energy per unit of biomass. The electrical energy as a proportion of the useful energy merely drops slightly, if the feeding of $CO_2$ is not exaggerated. For example, the ratio of current/heat drops from 52/48 to 47/53 if instead of the external sourcing of energy the electrical energy for the method according to the invention is procured from the hydrogen client who have fuel cells with a electrical efficiency of 60%. This applies without the feeding of $CO_2$ to the device for pre-heating the biomass. The moderate feeding of $CO_2$ into the process should not have any seriously disadvantageous effects provided that the current/heat ratio does not drop below 30/70. By way of example, in the real energy economy in Germany today a ratio of 20/80 is found. This also applies to the average household.

In the following the invention is explained in more detail with reference to FIGS. 1 to 5 using exemplary embodiments.

FIG. 3 shows an arrangement with 4 fluidized bed reactors and integrated catalytic bed;

FIG. 4 is a modification of FIG. 3 with additional gas purification prior to the catalytic bed;

Figure 1:
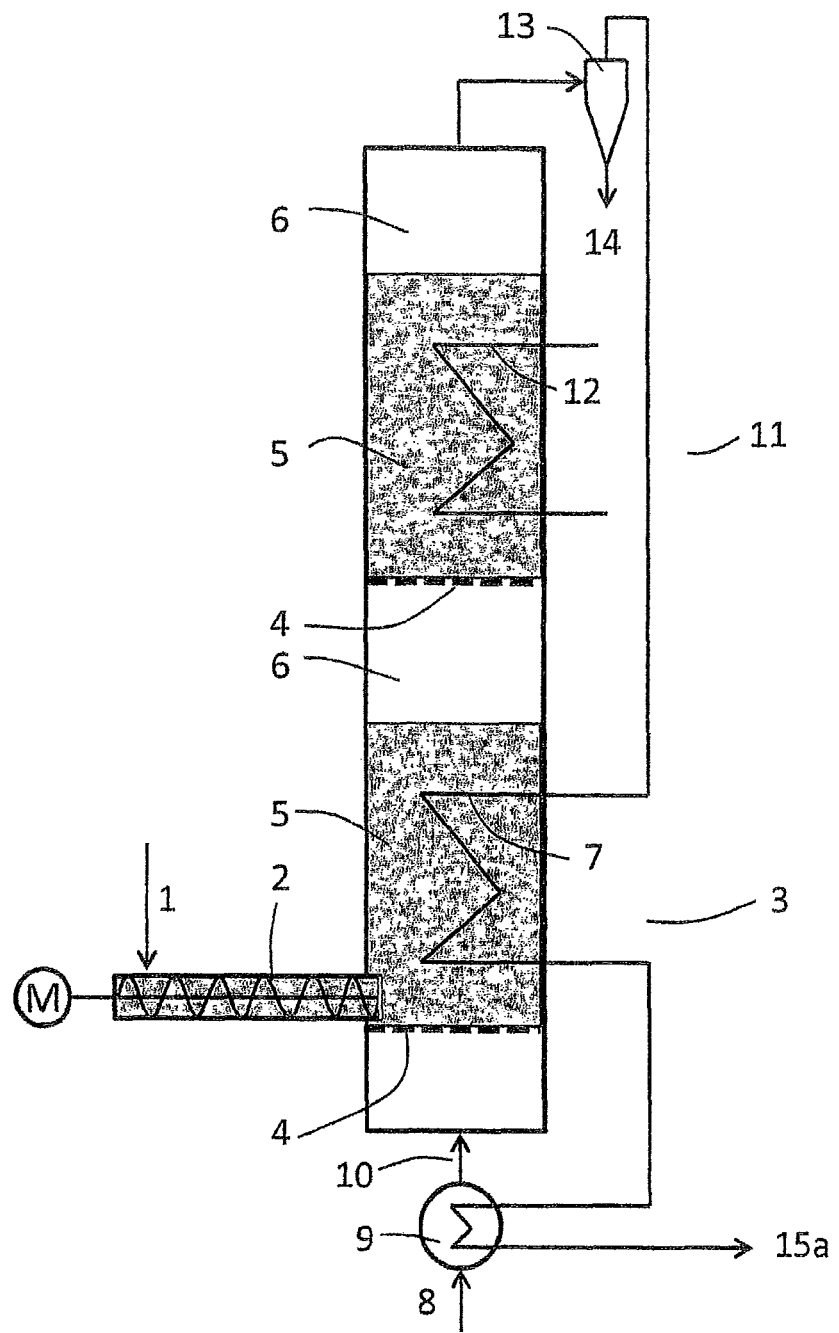
FIG. 1 shows a simple embodiment of the invention.

According to FIG. 1 the device according to the invention consists of the two fluidized bed reactors 3 and 11, which preferably have a stationary fluidized bed. The fluidized bed reactors in each case have a nozzle plate 4, a fluidized bed 5 and a free space 6 above the fluidized bed. The biomass 1 is for example introduced by means of a feed screw 2 into the fluidized bed reactor 3 and heated by an internal heating 7. In this example the heating comprises pipes, which have the hot synthesis gas 15a passing through them. In order to achieve a higher product quality, it is advantageous to heat this reactor with an additional electrical heating, not shown here, to at least 600° C.-700° C. The fluidizing gas used is hydrogen, which is fed via the line 10. The water that enters the line 8 is evaporated in the heat exchanger 9 and superheated. For this the sensible heat of the synthesis gas 15a is used.

In the fluidized bed reactor 3 the biomass is split into pyrolysis coke and pyrolysis gas. The pyrolysis coke together with the pyrolysis gas reaches the downstream fluidized bed reactor 11. By selecting the grain size of the sand used and the fluidizing gas speed it is possible to arrive at a situation where only coke particles of less than 0.8 mm reach the fluidized bed reactor 11. In addition the section of the free space 6 can be expanded in order to hold back large coke particles. The coke particles which have had their volatile components extensively removed, and which arrive at the fluidized bed reactor 11, are used for catalytic splitting of the tars of the pyrolysis gas. In order that the coke can also be converted into synthesis gas, in the fluidized bed reactor 11 temperatures of 800° C.-1,000° C. are generally necessary, preferably of 850° C.-950° C. The heating 12 of this reactor preferably takes place electrically, for example in the form of vertically arranged rods with electrical resistance heating. The heated part of these rods is completely surrounded by the fluidized bed. The synthesis gas 15a leaves the fluidized bed reactor 11 via the free space 6 whose section is preferably expanded. In the particle separator 13 the ash 14 is separated from the synthesis gas and discharged from the process. The sand in the reactors 3 and 11 can be continuously renewed by an in itself known conveyor device, not shown here.

Figure 2:
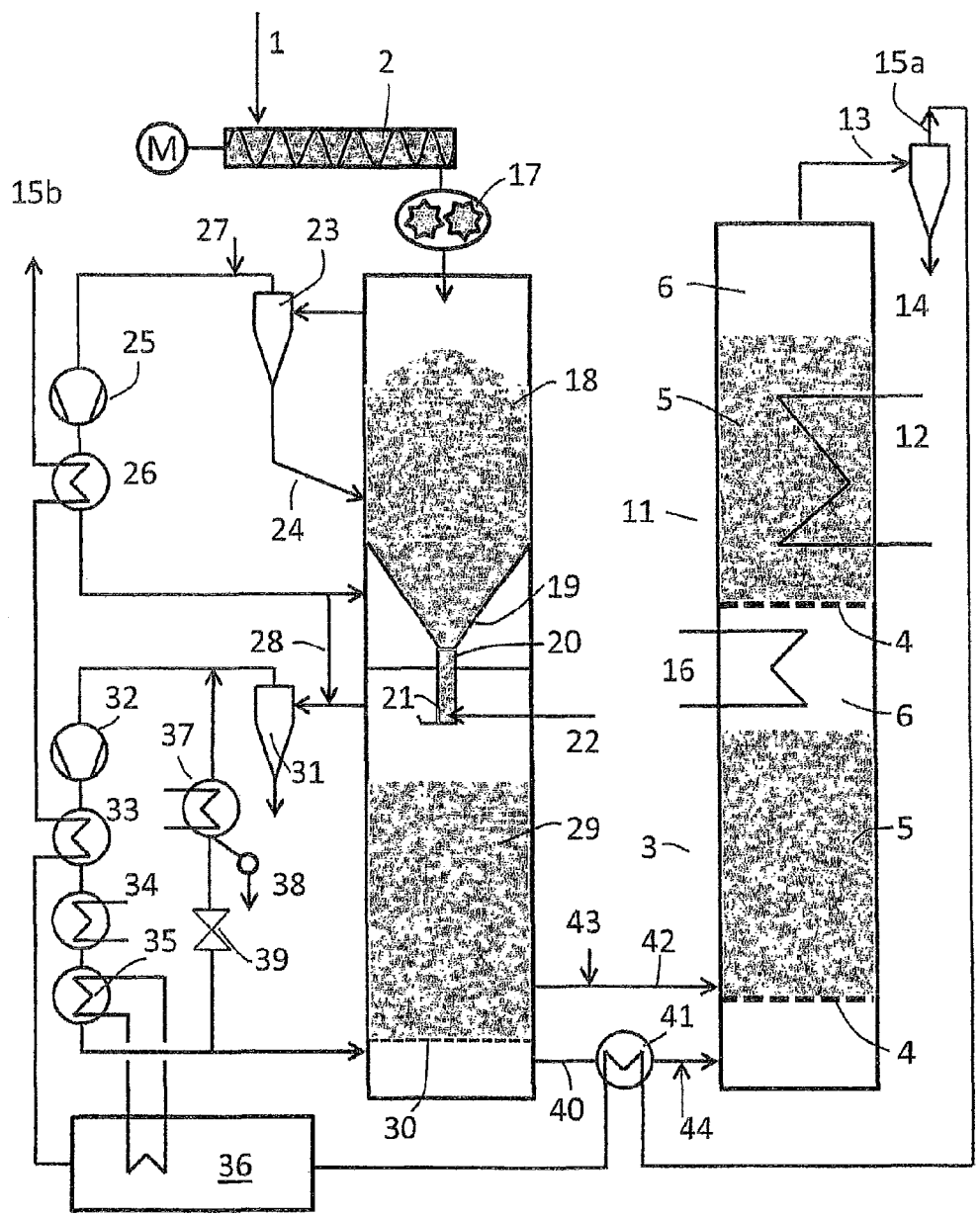
FIG. 2 shows a design of the invention with integrated pre-heating and drying of the biomass.

In FIG. 2 a device is shown which on the right-hand side has two fluidized bed reactors 3 and 11 as described above with the help of FIG. 1. In the free space 6 between the two fluidized bed reactors 3 and 11, however, a heating device 16 is arranged. This heating device can for example comprise a tubular heat exchanger, the tubes of which can be electrically heated. The pyrolysis gas and the coke particles are heated to a temperature here which is higher than that of the fluidized bed reactor 11. In this way a larger proportion of the tars and the coke particles is already converted into synthesis gas. With woody biomass with high ash melting points, the superheating can be operated to the extent that the heating 12 in the fluidized bed reactor 11 can be dispensed with. In the fluidized bed reactor 11 only coarse coke particles are then ground and converted. As a result of this chemical quench a lowering of the temperature occurs.

In order that the sensible heat from the method according to the invention can be rendered usable, the cascade of at least two fluidized bed reactors is preferably preceded by preheating and/or drying, the temperature level of which is below the decomposition temperature of the biomass of approximately 280° C.

The biomass 1 is fed into a pressurised container using a special feed screw 2. Here pre-heating of the biomass to a temperature level of 80° C.-150° C. takes place. Here the biomass 18 is passed through by a gas circuit comprising the compressor 25 and heat exchanger 26. The gas circuit also contains a separator 23, which feeds back the fine biomass dust into the container. The gas reaches the moving bed 18 of the biomass through the nozzle plate 19. The biomass then enters a downpipe 20 with an opening 21. By means of pulsing blasts of steam from the line 22 the biomass is withdrawn in a controlled manner into the next circuit. For the preheating and the subsequent drying it is advantageous if the biomass is formed into pieces of uniform size using an in itself known device 17. If this circuit has a gas mixed into it at point 27 then drying can already be achieved in this circuit in which the partial pressure of the water vapour is lower than the overall pressure. A small portion of the synthesis gas can be used for this purpose. Particularly suitable is $CO_2$ from a subsequent process stage of the synthesis gas. The excess gas from this circuit reaches via the line 28 an additional circuit, comprising a compressor 32 and the heat exchangers 33, 34, 35. The superheated exhaust vapours reach the moving bed of biomass 29 via the nozzle plate. Entrained particles are removed by the separator 31 and at point 43 added to the biomass. A subsequent process for further processing of the synthesis gas is indicated by 36. All these processes are exothermic and can provide waste heat for drying or preheating the biomass. For this the heat exchangers 34 and 35 can be used. The preheated and dried biomass reaches by means of a conveyor device 42, such as for example a metering screw-conveyor, in the first fluidized bed reactor 3, the pyrolysator. The exhaust vapours reach via the line 40 and the superheater 41 as fluidizing gas the fluidized bed reactor 3. At this point oxygen 41 can also be added without problems. Additional heating of the fluidized bed reactor 3 is only necessary, however, if in this reactor for the purposes of further product improvement a more extensive conversion of the carbon is sought.

If the biomass fed in contains more water than is necessary for the process, this can be removed via the condenser 37 and the condensating separator 38. This bypass is controlled by the valve 39 and should only be used for fine tuning. The biomass should as far as possible, prior to transfer into the process, be prepared with the optimum water content by mixing, pressing and/or drying.

This additional circuit is suitable for final drying and subsequent pre-heating of the biomass to just below the decomposition temperature of approximately 280° C. An additional circuit is particularly advantageous if the process is to be operated at high pressure, for example at 30 bar.

In FIG. 3 a cascade of four fluidized bed reactors 45, 46, 47 and 48 is shown. This cascading alone already allows high product quality. Here the product flow of gas and coke, after the fluidized bed reactor 46, is diverted by means of baffle plate 57a to the separator 49. The coke is fed by line 50 to the fluidized bed reactor 47. The particle-free gas in line 51 can now be heated without any concern for ash melting, for example by means of the electrical heating register 52. To further support the tar splitting below the fluidized bed reactor 47a nickel-based catalytic bed 53 can be arranged, for example in the form of an in itself known honeycomb. In order to refresh the catalytic activity it is useful to arrange a number of pipes 56 with nozzles. With alternating blasts of steam from one of the pipes 56 refreshing during operation is possible. In the event that the biomass is to be used with a very low ash melting point it is useful to mix the heated gas with the synthesis gas cooled by the line 55 or another cool gas from a subordinate process. Gases containing methane from a subordinate process are better fed in at point 54, thus prior to the catalytic bed, so that the methane can be split. Here the heating section is arranged in the middle of the cascade. Depending on the heat distribution, this station can also be arranged at another point. The arrangement shown is aimed at a high carbon conversion at comparatively low temperatures.

The cascade of fluidized bed reactors has preheated biomass fed to it by a conveyor device 42 and heated exhaust vapours via line 40, as shown in FIG. 2. The lower fluidized bed reactor 45 can in heating device 7 be heated with process heat, but this is not essential. Heating is, however advantageous for putting into operation. The subordinate fluidized bed reactors 46, 47 and 48 should preferably be heated with electrical heating 12. At the points identified by 44 oxygen can, but does not have to, be added. In a hydrogen economy oxygen merely increases the average current component of the useful energy at the end customer. The oxygen has virtually no influence on the efficiency.

FIG. 4 shows a device according to the invention, which is virtually identical to FIG. 3. The only difference is that the gas following separation of the coke passes through a hot gas cleaning stage 60. As catalysts, which have a good cleaning effect for sulphur, metal oxides are especially suitable. In order to allow regeneration during operation as well, the gas cleaning should preferably be provided twice. Hot gas cleaning is advantageous for biomass with a high sulphur content, because then the catalytic bed 53 even at low temperatures has a high efficiency and long lifetime. For the hot gas cleaning the gas should preferably be cooled to temperatures below 600° C. This can take place by part of the exhaust vapour from line 40 being diverted with the valve 58 to the cooler 59. The cooling of the gas with cooler 59 has practically no influence on the efficiency. All it does is change the temperature graduation in the cascade of fluidized bed reactors and the quantity of electrical energy to be introduced in each case.

Figure 5:
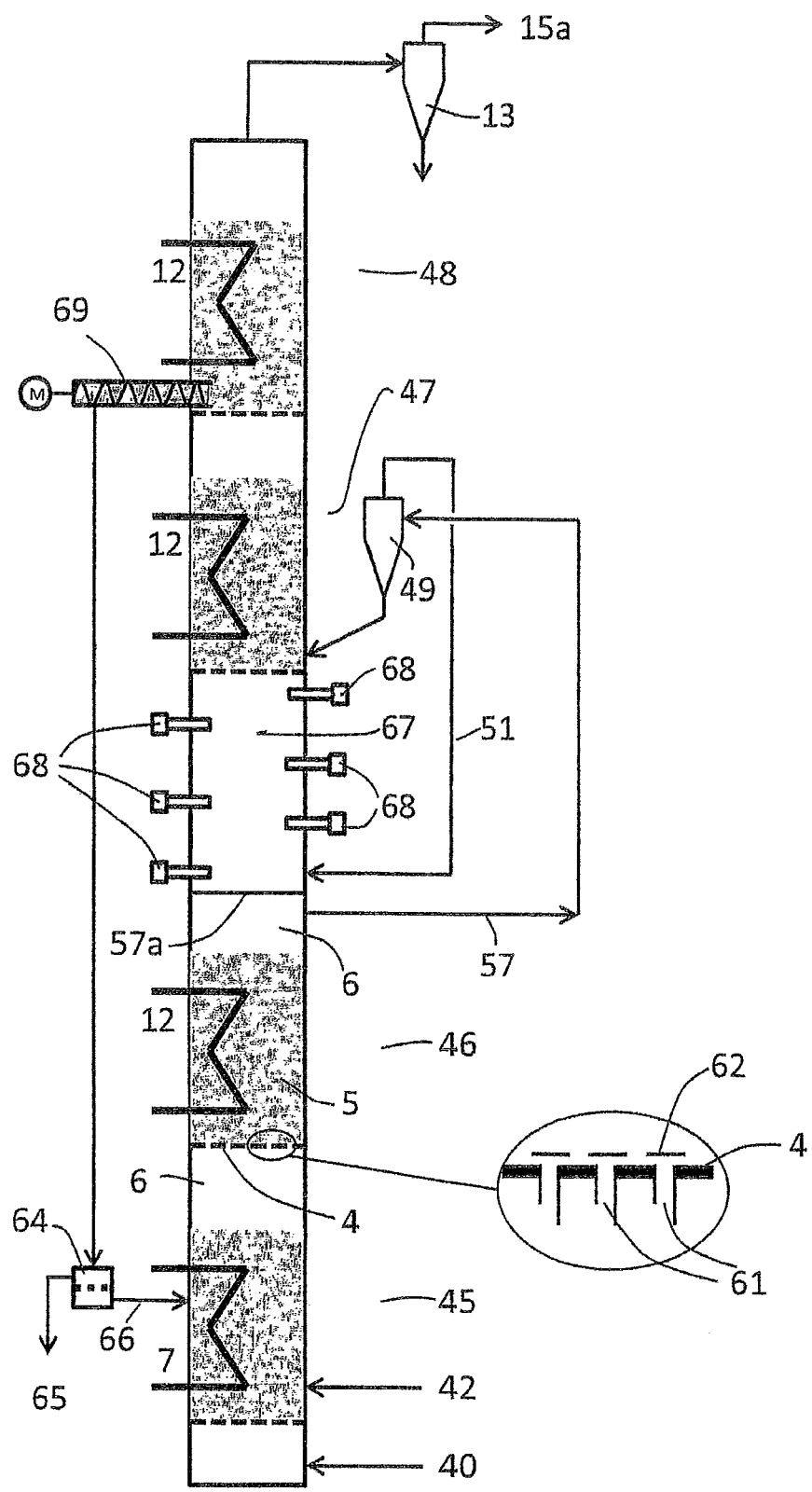
FIG. 5 shows an arrangement in which the tars are destroyed through the creation of a plasma.

FIG. 5 shows an arrangement similar to FIG. 3. Here, however, the catalytic bed has been replaced by a number of electrodes 68, between which electronic discharges are triggered in alternating directions and at short intervals. As a result of this the gas is brought in part into the plasma state. The resultant radicals split all hydrocarbons with which they come into contact into carbon (cracking soot) and hydrogen, which is then immediately or in the subordinate fluidized bed reactor 47 converted into synthesis gas. The "strobe lighting" however generates high turbulence in the gas, resulting in a high reaction rate. An increase in temperature is also associated with the plasma generation, which in itself causes a splitting of the tars. The plasma heating is therefore a particularly effective form of tar destruction. In this way ageing or contamination, as occurs with a catalytic bed, is avoided.

The replacement or exchange of the bed material can, as mentioned, be carried out separately for each fluidized bed reactor by in themselves known devices. An advantageous solution consists of adding to the biomass a small amount of sand and removing the sand only at the hottest fluidized bed reactor 48. Withdrawal can for example take place by means of a worm 69. The sand, roughened by sintering, is then separated by a sieve 64 and transferred out via sluices. The unused sand is then passed to the lowest fluidized bed reactor 45, for example by means of pneumatic conveyor system. In order to avoid impacts from an overfilled fluidizing bed, it is useful to fit the nozzle plate 4 with tubes 61 which protrude to some extent into the free space 6 and are bevelled. To avoid sand flowing back when the system is at a standstill baffle plates 62 or radial bore holes can be arranged. The sand bed management is particularly suitable for fluidized bed reactors which are operated at the threshold between the stationary and circulating fluidized bed.

The invention is not limited to the exemplary embodiments described, rather for a person skilled in the art many possibilities for variation and development will emerge in connection with the invention. In particular the scope of protection of the invention is defined by the claims.

The invention claimed is:

1. A method for producing low-tar synthesis gas from biomass comprising:
    decomposing the biomass into at least the components pyrolysis gas and pyrolysis coke in at least one first fluidized bed reactor; and
    feeding the pyrolysis gas generated in the first fluidized bed reactor as fluidizing gas to at least one subsequent fluidized bed reactor,
    wherein the pyrolysis coke is withdrawn in fine particles with the pyrolysis gas and fed to the at least one subsequent fluidized bed reactor for producing synthesis gas,
    and the fine particles of pyrolysis coke are separated from the pyrolysis gas and the pyrolysis gas and the fine particles are each fed to the subsequent fluidized bed reactor on separate paths.

2. The method according to claim 1, wherein the pyrolysis gas is heated prior to entering the subsequent fluidized bed reactor.

3. The method according to claim 1, wherein the pyrolysis gas is converted by electrical energy at least in part into the plasma state and then fed via a nozzle plate to the at least one subsequent fluidized bed reactor.

4. The method according to claim 1, wherein the pyrolysis gas flows through a catalytic bed and is then fed via a nozzle plate to the at least one subsequent fluidized bed reactor.

5. The method according to claim 1, wherein the pyrolysis gas is essentially rid of at least one of halogenides and alkalis.

6. The method according to claim 1, wherein at least two fluidized bed reactors are arranged one on top of the other.

7. The method according to claim 1, wherein the biomass is dried prior to entering the first fluidized bed reactor.

8. The method according to claim 7, wherein the drying takes place in a drying device, having an exhaust vapours circuit with a heat exchanger, wherein the exhaust vapours are fed to the first fluidized bed reactor as fluidizing gas.

9. The method according to claim 7, wherein the biomass is preheated prior to drying.

10. The method according to claim 9, wherein the preheating of the biomass takes place in a preheating device which has a gas circuit with a heat exchanger, wherein the gas is fed to the drying device.

11. The method according to claim 10, wherein the preheating device is fed carbon dioxide ($CO_2$) from a process for further processing of the synthesis gas.

12. The method according to claim 1, wherein the pyrolysis gas is separated from the fine particles and only the pyrolysis gas is fed to the at least one subsequent fluidized bed reactor via the nozzle plate.

13. The method according to claim 1, wherein the first fluidized bed reactor includes an inert bedding material.

14. The method according to claim 13, wherein the inert bedding material is sand.

15. The method according to claim 1, wherein the at least one subsequent fluidized bed reactor includes an inert bedding material.

16. The method according to claim 15, wherein the inert bedding material is sand.

* * * * *